Feb. 18, 1930.  M. REBARCHAK  1,747,181
MECHANICAL SEAL
Filed June 3, 1927
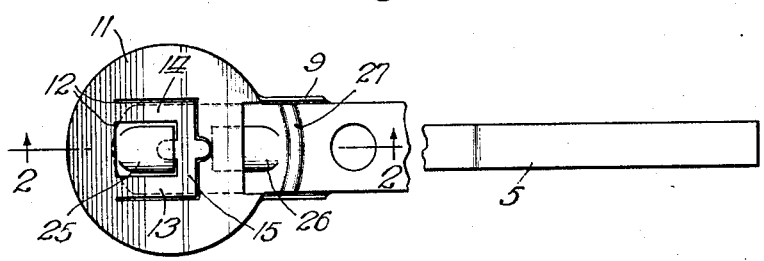
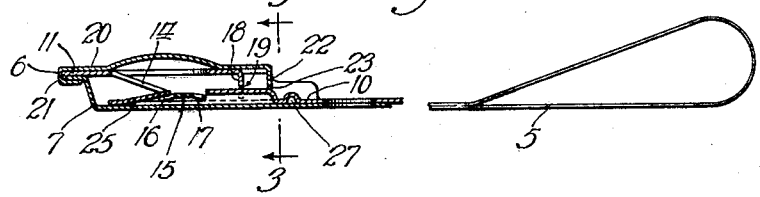
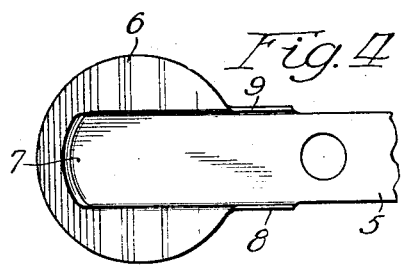
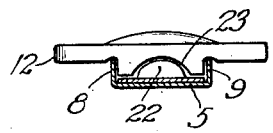
Inventor
Michael Rebarchak
by Jabel & Banning
Attys.

Patented Feb. 18, 1930

1,747,181

UNITED STATES PATENT OFFICE

MICHAEL REBARCHAK, OF CHICAGO, ILLINOIS, ASSIGNOR OF ONE-HALF TO FRANK ACCETTURA, OF CHICAGO, ILLINOIS

MECHANICAL SEAL

Application filed June 3, 1927. Serial No. 196,238.

My invention relates to mechanical seals, such, for instance, as are used in sealing the doors of railway cars so as to detect any unauthorized opening of the cars while they are loaded.

The principal object of the invention is to provide a seal of this character which will be of a few simple parts and which cannot be picked without in some way defacing the seal so as to make it obvious that it has been tampered with.

It is also a purpose of the invention to construct a seal of this character wherein the necessity of making any portion thereof of spring material, such as steel, is avoided.

Other objects and advantages of the invention will appear as the description proceeds, when taken in connection with the accompanying drawings. It is obvious, however, that minor modifications may be made in the device without departing from the spirit of the invention, and all such modifications as fall within the scope of the claim are to be understood as forming part of this invention.

In the drawings,—

Fig. 1 is a plan view of the seal with the cap removed;

Fig. 2 is a sectional view taken centrally along the line 2—2 of Fig. 1;

Fig. 3 is a section on the line 3—3 of Fig. 2; and

Fig. 4 is a plan view of the end of the shackle member which forms a base to receive the locking mechanism of the seal.

Referring now in detail to the drawings, the seal consists of the usual thin, flat strip of metal 5, usually termed the shackle, which at one end thereof is provided with the enlarged, round end 6, which is pressed downwardly to provide the depressed portion 7, which, as shown, terminates short of the end of the strip 5 and is substantially the same width as the main body portion thereof. Projecting from the round portion 6 in the direction of extension of the member 5 are the upturned flanges 8 and 9, which form a guide for the locking end 10 of the shackle member. Seated upon the flat portion 6 is the disk 11, which, as shown, is cut out at 12 to provide the latch consisting of the side members 13 and 14 and the connecting end piece 15, this latch being bent downwardly, as shown in Fig. 2, into the recess 7.

The end piece 15, as shown clearly in Figs. 1 and 2, is provided with the oppositely projecting tongues 16 and 17, which are formed integral therewith by being struck out of the material of the disk 11. These tongues 16 and 17, as shown in Fig. 2, are turned downward slightly for a purpose which will presently appear. The disk 11 is also provided with the downturned portion 18, which has a recess 19 therein. The cap portion 20 is adapted to fit over the disk 11 and the round portion 6, and to be turned over at the edge, as shown at 21, to clamp the parts firmly together so that they cannot be separated without destroying the seal. The cap 20 also has at its forward end the downturned projection 22 recessed at 23 for a purpose which will presently appear. The downturned portions 18 and 22 are just the width of the space between the flanges 8 and 9 so as to form, with the exception of the recesses 19 and 23, a barrier to prevent insertion of anything into the interior of the seal. The free end 10 of the shackle, as shown, is provided with a pair of struck-up portions 25 and 26, each of which at their adjacent ends is cut out to provide an opening adapted to receive the tongues 16 and 17.

Thus, when the free end portion of the shackle is inserted after it has passed through the hasps or rings on the car door, the projections 25 and 26 will pass through the recesses 19 and 23, and the end of the member will pass beneath the end piece 15 and on into the recess 7 until it extends far enough for the tongue 16 to snap down behind the projection 25, whereupon, if the free end of the shackle is again pulled outwardly, the tongue 17 will snap down into the position shown in Fig. 2, behind the projection 26. Thus the seal is locked, and it is practically impossible to insert any tool or instrument into the body of the seal to lift the tongues 16 and 17 out of their locking position.

As a further preventative against insertion of such a tool, I provide the ridge 27 extending transversely across the shackle and directly behind the projection 26. This projection makes it necessary to bend whatever tool is used and also to bend the downward projections 18 and 22 before a tool can be inserted into the seat.

It is obvious from the above description that the disk 11, since the tongue 16 and 17 formed thereon need have but very little spring action and do not directly bear the pull in case it is desired to break the seal, may be made of tin, such as the rest of the seal is usually made of, this being sufficiently resilient to cause the tongues to snap into position when the seal is closed.

From the above description, it is thought the construction and advantages of this device will be apparent to those skilled in this art, and having thus described my invention, what I claim and desire to secure by Letters Patent of the United States is:

A mechanical seal comprising a locking piece having a pair of tongues thereon directed away from each other, a casing housing said locking piece, a shackle having one end permanently secured to the casing and the free end provided with a pair of struckup portions cut away at their adjacent ends to provide openings receiving said tongues when said free end is inserted into said casing.

In witness whereof, I hereunto subscribe my name this 18th day of May, A. D. 1927.

MICHAEL REBARCHAK.